Aug. 1, 1967 M. BOGAARDT ETAL 3,334,019
FISSILE ELEMENT HAVING A BURNABLE POISON
Filed Aug. 31, 1964 3 Sheets-Sheet 1
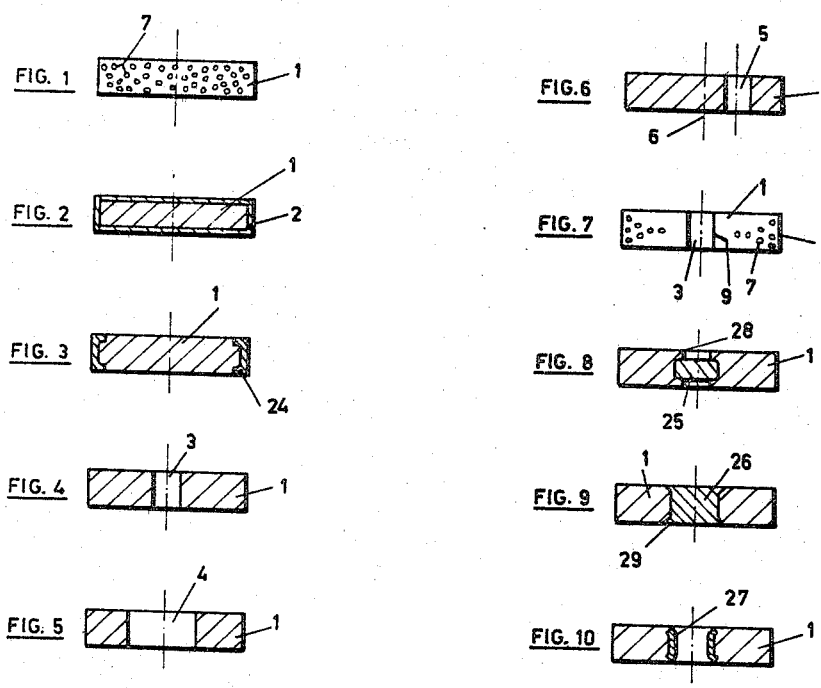
Inventors
Maarten Bogaardt
Wilhelmus W. Nijs
Johannes Cohoorn
BY
Cushman, Darby & Cushman
Attorneys Aug. 1, 1967  M. BOGAARDT ETAL  3,334,019
FISSILE ELEMENT HAVING A BURNABLE POISON
Filed Aug. 31, 1964  3 Sheets-Sheet 3

Inventors
Maarten Bogaardt
Wilhelmus W. Nijs
Johannes Coehoorn

BY Cushman, Darby & Cushman
Attorneys

United States Patent Office 3,334,019
Patented Aug. 1, 1967

3,334,019
FISSILE ELEMENT HAVING A BURNABLE POISON
Maarten Bogaardt, The Hague, Wilhelmus W. Nijs, Rijswijk, and Johannes Coehoorn, Bergen, North Holland, Netherlands, assignors to Reactor Centrum Nederland, The Hague, Netherlands, an institute of the Netherlands
Filed Aug. 31, 1964, Ser. No. 393,335
Claims priority, application Netherlands, Feb. 21, 1964, 6,401,633
6 Claims. (Cl. 176—40)

The invention relates to a fissile element for nuclear reactors, containing fissile elements to which a burnable poison has been added. By "burnable poison" is meant a neutron-absorbing substance which during operation of the reactor is converted in such a manner that the neutron-absorbing properties diminish.

This diminution should keep pace with the increase of neutron-absorbing capacity of the reactor core, which occurs as a result of fission and the decrease of fissile capacity in the fissile substance itself.

If this increase and decrease compensate each other, it will be found unnecessary or almost unnecessary to effect gradual variation in reactivity of the reactor by means of control rods.

Fissile elements containing burnable poison are known. However, as a rule the existing fissile elements of this kind are of such a composition that the poison therein is distributed as homogeneously as possible (viz atomically). This homogeneous distribution entails a very great drawback.

As may be considered to be known, the object aimed at by the addition of burnable poison is in the first place to control the tendency of the reactivity of a reactor to change during its life.

If a curve representing the absorbing capacity of the poison as a function of time is plotted for known fissile substances with poison, it is found that with uniform or homogeneous distribution of the poison as normally applied this capacity drops very rapidly.

This means, in other words, that the burnable poison too quickly becomes ineffective, as a result of which one has to seek other measures to achieve the result that the surplus reactivity which is available at the commencement of the reactor is absorbed.

Also if one wishes to use a burnable poison to counteract local concentration of the neutron flux, so-called "flux peaking," the result of using a burnable poison which disappears too rapidly is that after awhile this unwanted neutron concentration, accompanied by excessively high local temperatures, returns again.

According to the invention the above-mentioned drawbacks can be remedied by embedding the burnable poison as discrete particles in a carrier. The discrete particles may, for instance very suitably be grains.

When using poison particles of this kind it is found that for the neutron flux they are perfectly "black." This means that mainly the outer side of the particles or grains is attacked and gradually vanishes. The effects of this is that the speed at which the poison vanishes is greatly reduced. The curve showing the relation between neutron absorbing capacity and time acquires in this way a much flatter trend.

It has been found that it is expedient to use grains having a dimension of, say, 150 to 200 microns. The material of these grains might, for instance, be composed of boron or a boron compound, dysprosium or samarium, cadmium or europeum. Grains of this material may be embedded in a carrier substance such as iron, or an iron alloy such as stainless steel, or of a zirconium compound, or of graphite. The carrier substance may also be made of $Al_2O_3$ or $SiO_2$.

It is an advantage to give a special shape to the carrier substance in which the poison grains are embedded. The best plan appears to be to use carriers having the shape of small plates. If these plates are made of the same diameter as the fissile tablets or bars, it will at once be possible to make the fissile tablets or bars in fissile elements alternate with poison plates.

Another interesting possibility is to provide an aperture, a recess or a notch in the above-mentioned poison plates. By making such a recess larger or smaller or by varying the number of recesses it is possible to alter the amount of poison locally in the reactor. The larger the aperture is made, e.g. in the central part of a poison plate of this kind, the less poison will be present at a particular place. The direct result of this is that the temperature at the center of a poison plate is lowered.

The above-mentioned aperture which is provided in the central part of the carrier plates need not be in a precisely central position. In many cases it may be an advantage to make such an aperture actually eccentrically so that by a suitable directioning of this aperture it is possible to exert an influence on the neutron flux distribution locally in the reactor core.

It is also feasible to combine with the above a form of construction of the carrier plate in which the poison grains are unequally distributed, e.g. in such a way that the concentration of poison grains along a narrow surface of the carrier plate is greater than that along a wide surface of the plate or vice versa. Between these extreme values of the grain concentration there should be a gradual change in grain concentration.

If the carrier material is magnetic an additional advantage will be afforded, because in this way, when spent fissile elements are to be processed it is possible in an easy manner to remove the poison plates magnetically from the old fissile elements. As is known, special precautions must be taken during the dismantling of fissile elements of this kind because the elements remain radioactive for a time. All the dismantling operations should therefore be carried out in so-called hot-cells in which manipulators are used with remote control. When the fissile bars have been opened, a manipulator provided with a powerful magnet (preferably an electromagnet) is able to attract the poison plates to which magnetic material, e.g. iron, has been applied, to hold these plates and to separate them from the tablets, cylinders or grains of fissile material.

An identical advantage can be achieved if the carrier material in itself is non-magnetic, by covering the poison plates on the outer side with a layer of magnetic material, such as iron. This covering layer may entirely envelop the carrier material, but this is not absolutely necessary. In many cases it is sufficient if a part of the outer side or inner side of the covering layer is made of magnetic material. It is even possible to incorporate again a core of magnetic material in the aperture provided in the carrier plate, which core is fixed by beading the ends.

The invention will be further understood from the following detailed description taken with the drawings in which:

FIGURE 1 is a cross sectional view of a poison plate in which poison grains are distributed homogeneously;

FIGURE 2 is a cross sectional view of a poison plate which is externally covered with a thin layer of iron;

FIGURE 3 is a cross sectional view of a poison plate that is only partly covered externally with a thin layer of iron;

FIGURES 4 and 5 are cross sectional views of poison plates having an aperture in the middle;

FIGURE 6 is a cross sectional view of a poison plate in which at least one of the apertures is eccentrically positioned;

FIGURE 7 is a cross sectional view of a poison plate in which the poison grains are unequally distributed;

FIGURES 8, 9 and 10 are cross sectional views of poison plates having a magnetic core;

Figure 12:
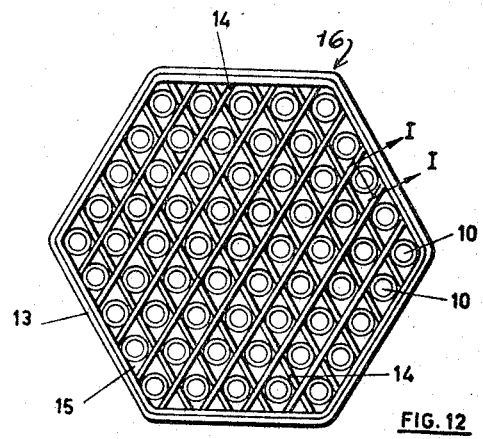
FIGURE 12 is a top plan view of a reactor core grid supporting a plurality of the fissile elements of FIGURE 11.

FIGURE 1 gives a cross-section through a poison plate 1 which may, for instance, be circular in shape. As indicated by the grain distribution in the figure, we are concerned here with a practically uniform distribution of the grains 7.

In the following FIGURES 2–6 and 8–10 it is not specifically stated whether the grain distribution is uniform or not. The poison plates in this case are simply hatched. FIGURE 2 shows a poison plate 1 whose exterior surfaces are covered with a layer of iron 2.

In the embodiment represented in FIGURE 3 only the outer narrow edge of the poison plate is covered with a layer of magnetic material 24. In FIGURE 4 a small central aperture or bore 3 is provided in the poison plate 1. The same applies to FIGURE 5 in which, however, the bore 4 is of greater diameter.

If in the plates represented in FIGURES 4 and 5 a uniform grain distribution is employed, and the amount of the poison may thus be modified by varying the dimension of the aperture. Thus, with an identical uniform grain distribution, the amount of poison present in the plate illustrated in FIGURE 5 is less than the amount in the plate of FIGURE 4.

In FIGURE 6 a bore or aperture 5 is provided in such a way that this aperture is eccentrically positioned, or offset, with respect to the center 6 of the poison plate 1.

FIGURE 7 shows a poison plate 1 in which a central bore 3 is provided and in which the grains 7 are non-uniformly distributed in such a way that the grain concentration on the outer side 8 of the plate is greater than on the inner side 9 near the central bore 3.

FIGURE 8 shows a poison plate 1 provided with an aperture in which a core of magnetic material 25 has been fixed by beading the carrier material at 28.

FIGURE 9 discloses a modification of the FIGURE 8 construction in which a core of magnetic material 26 has been fixed in an aperture by expanding the ends of the core.

Finally, FIGURE 10 shows a variant of FIGURE 9 in which an aperture is provided in a magnetic core 27.

Figure 11:
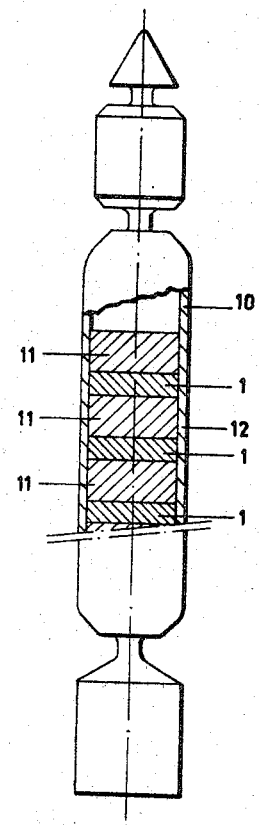
FIGURE 11 is an elevational view, partly broken away, of a fissile element.

FIGURE 11 shows a fissile rod 10, or fuel element, in which poison plates 1 and fissile plates 11 are stacked alternately. Although the example shows that a poison plate is in each case followed by a fissile plate, other forms of stacking are also possible. For instance, every two fissile plates or tablets may be followed by one poison plate.

The stack of plates obtained in this way is enclosed by an outer jacket 12 of the fissile rod.

FIGURE 12 gives a top plan view of a fissile element or supporting grid 16 in which a plurality of fissile rods 10 is supported. This grid is made up of an outer sheath 13 between which there extend plate-shaped strips 14. These strips 14 are positioned in two layers, one above the other, so that in each layer the strips are positioned parallel to each other. These strips together enclose a plurality of diamond-shaped sections 15 which closely surround the fissile rods 10.

Figure 13:
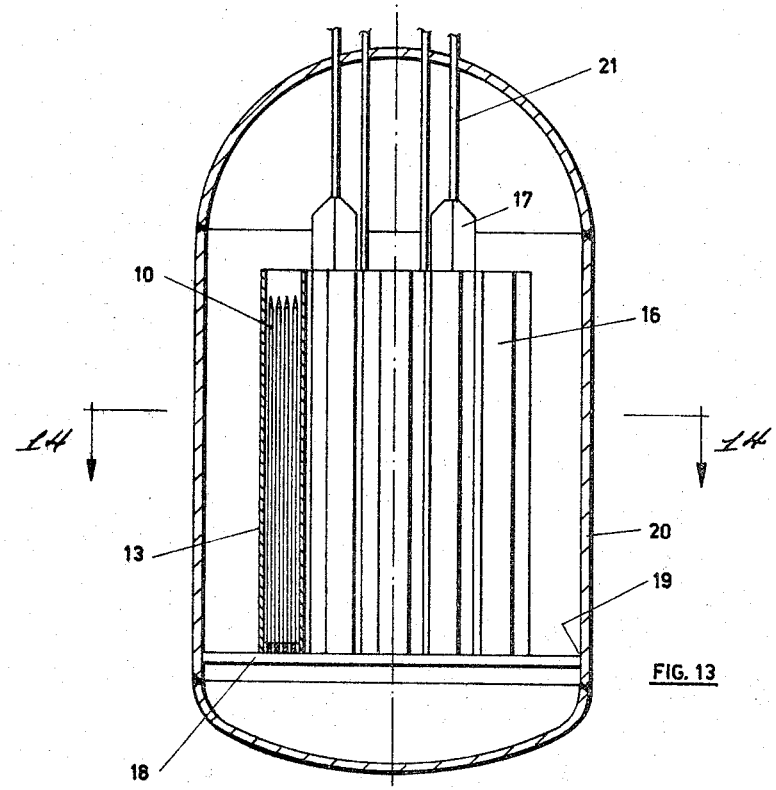
FIGURE 13 is a vertical sectional view of a nuclear reactor.

FIGURE 13 shows in a vertical cross-section through a reactor vessel how the fissile rods 10 are positioned therein. Here again 13 represents the outer sheath of each fissile element 16. A large number of these elements 16 are mounted side by side in the reactor vessel in such a way that a reactor core is formed. Space for the insertion or regulating or control rods 17 is left open between a number of fissile elements 16. Two of these rods 17 together with their manipulating rods 21 are shown in a somewhat extended position.

The fissile elements 16 rest on a foundation plate 18 which is fixed on its outer side in the reactor vessel at 19 to the inner side of the reactor jacket 20. Feed and discharge connections (not shown) for the coolant are provided in a conventional manner.

Figure 14:
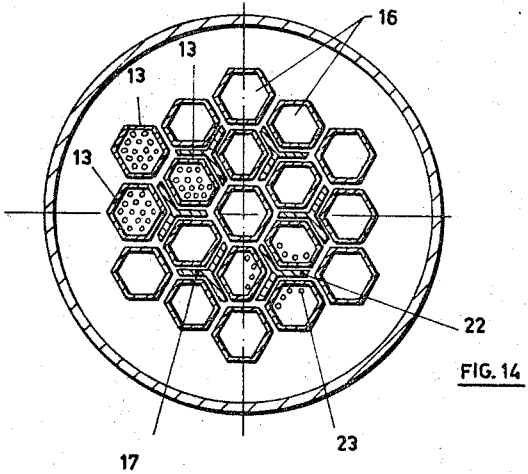
FIGURE 14 is a sectional view taken on the line 14—14 of FIGURE 13.

In FIGURES 13 and 14 the fissile rods 10 are omitted from some of the fissile elements 16 for the sake of clearness.

It is known that "flux-peaking" may occur in a reactor core as a result of the distortion of neutron flux by a control rod. In order to counteract this, the fissile rods which are close to a control rod should be provided with poison plates even through the other rods within the same fissile element do not contain poison plates. This arrangement is illustrated in the lower right portion of FIGURE 14 wherein a flux-distorting control rod is illustrated at 22 and the poison-containing fissile rods are illustrated at 23. The remainder of the rods (not shown) which are disposed within the same fissile elements as the rods 23 do not contain poison plates.

The effect which counteracts "flux-peaking" may be further intensified by making use of poison plates having an eccentrically positioned aperture (see FIGURE 6) and mounting these plates in the reactor in such a way that the aperture faces away from the adjacent control rod surface. The concentration of poison is then particularly great in the part of the fissile bar that is situated near the control rod.

While several embodiments of the invention have been described and illustrated the details thereof are not intended to be limiting except as they appear in the appended claims.

The spacing between the poison particles in the carrier material is thus, that the mean distance between neighbouring grains or particles is at least 0.25 times and at the most 25 times the grain size. Below a mean distance of 0.25 times the grain size, the self-shielding effect is disturbed by neighbouring grains. Above 25 times the grain size the concentration of the poison becomes too low for practical purposes.

What is claimed is:

1. A nuclear reactor core comprising a plurality of fissile fuel elements and at least one neutron-absorbing control rod surrounded by said fissile elements, said fissile elements containing fissile material and a burnable reactor poison material, said poison material being embedded as discrete particles in a carrier material, at least one of said fissile elements being constructed of plates of said fissionable material stacked along a common axis with plates of said carrier material, each of said plates of carrier material having an aperture therethrough whose axis is parallel to and offset from said common axis, said apertures facing away from said control rod.

2. A fuel element for a nuclear reactor comprising an elongated body of uniform transverse cross section, said body being made up of a plurality of fuel plates and a plurality of burnable poison plates, said fuel plates and said burnable poison plates extending transversely of said fuel element and being stacked in an alternating arrangement such that at least one burnable poison plate alternates with at least one fuel plate and such that at least one burnable poison plate is disposed axially inwardly of the ends of said fuel element, each of said burnable poison plates being composed of a carrier material free of fissile material and having embedded therein a burnable poison in the form of discrete grains the sizes of which lie in the range 150 microns to 200 microns.

3. A fuel element according to claim 2, wherein the said carrier material is composed of graphite.

4. A fuel element according to claim 2, wherein the said carrier material is composed of $SiO_2$.

5. A fuel element according to claim 2, wherein the spacing between the poison grains or particles in the carrier material is thus, that the mean distance between neighboring grains or particles is at least 0.25 times and at the most 25 times the grain or particle size.

6. A fuel element for a nuclear reactor comprising: an elongated body made up of a plurality of fuel plates and a plurality of burnable poison plates, said burnable poison plates extending transversely of said fuel element and being stacked in an alternating arrangement with the fuel plates, each of said burnable poison plates being composed of a carrier material free of fissile material and having embedded therein a burnable poison in the form of discrete grains, at least a part of the surface of each poison plate consisting of a magnetic material, said fuel plates being free of any appreciable magnetic material whereby said poison plates may be separated subsequently from said fuel plates by magnetic attraction.

References Cited

UNITED STATES PATENTS

| | | | |
|---|---|---|---|
| 791,305 | 5/1905 | Weiss | 209—8 |
| 861,782 | 7/1907 | Wait | 209—8 |
| 2,984,613 | 5/1961 | Bassett | 176—93 |
| 3,119,747 | 1/1964 | Wallace et al. | 176—68 X |
| 3,122,484 | 2/1964 | Iskenderian. | |
| 3,137,636 | 6/1964 | Wikner. | |
| 3,147,191 | 9/1964 | Crowther | 176—68 |
| 3,175,955 | 3/1965 | Cheverton | 176—93 |

REUBEN EPSTEIN, *Primary Examiner.*